E. HUONCKER.
Horse Hay-Fork.
No. 87,979.
Patented March 16, 1869.
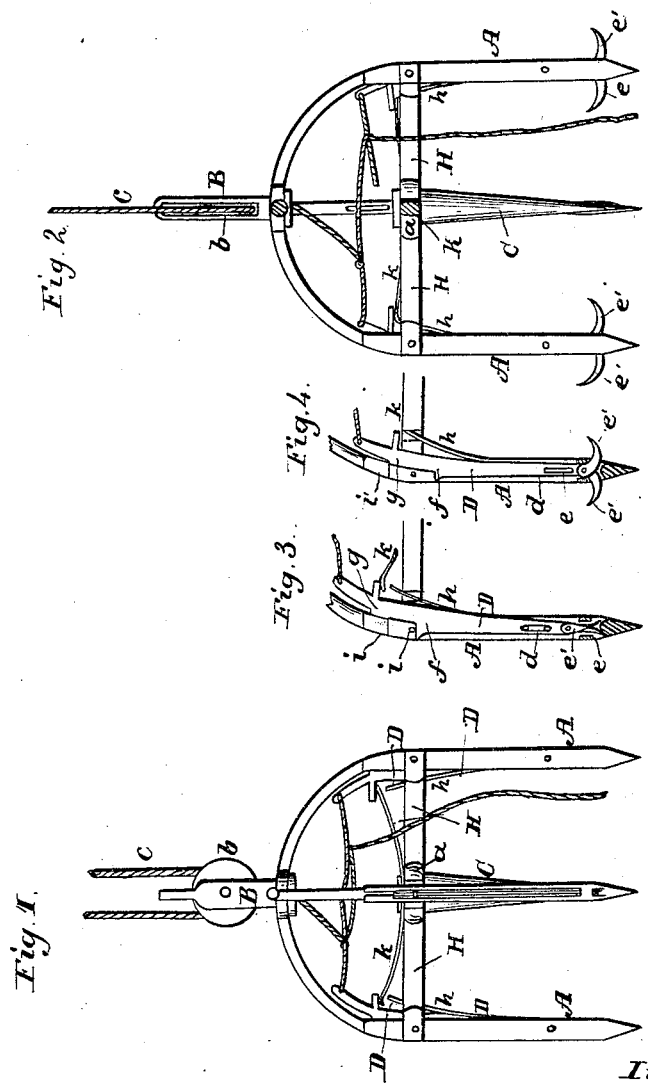

EMANUEL HUONCKER, OF BETHEL, PENNSYLVANIA.

Letters Patent No. 87,979, dated March 16, 1869.

IMPROVEMENT IN HORSE HAY-FORKS.

The Schedule referred to in these Letters Patent and making part of the same.

*To all whom it may concern:*

Be it known that I, EMANUEL HUONCKER, of Bethel Post Office, county of Berks, and State of Pennsylvania, have invented a new and useful Improvement in Horse Hay-Forks; and I do hereby declare the following to be a clear and exact description thereof, sufficient to enable others skilled in the art to which my invention appertains, to fully understand and use the same.

This hay-fork is especially adapted for elevating cocks of hay bodily, so as to deposit the same upon the hay-cart; and My invention consists in a device composed of a number of tines or arms, some or all of which are provided with barbs, which can be thrown out or drawn within the tines by means of rods suitably constructed and arranged for the purpose, as will be hereinafter described.

In the accompanying drawings—

Figure 1 is a side elevation of my improved fork, showing the barbs concealed in the tines.

Figure 2 is a similar view, showing the barbs thrown out.

Figure 3 is a longitudinal section of one of the tines, showing the position of the barbs, and the means for actuating the same, when said barbs are concealed in the tines.

Figure 4 is a similar view, showing the position of said parts when the barbs are distended or thrown out.

A A A A designate four tines, connected together at their upper ends by a collar, $a$, through which collar passes a swivel, B, provided with a pulley, $b$, on which latter a rope or chain, $c$, may be passed, for elevating the device.

C is a central tine secured to arms H, radiating inward from the tines A, said arms serving as braces to steady the tines.

Within the tines a rod or plate, D, is arranged in such a manner as to have a vertical motion, the distance of its travel being regulated by a pin, $d$, extending from one side of a tine, and entering a slot, $e$, in said rod, as clearly shown in figs. 2 and 3.

The longer end of each rod D is provided with barbs $e'$, and the upper end is provided with two shoulders, $f$ $g$, which, by means of a spring, $h$, are alternately thrown under a stay-pin, $i$, and a ledge, $i'$, accordingly as to whether the barbs are withdrawn or distended, as will be fully understood by reference to figs. 2 and 3.

Springs $k$ serve to elevate the rod D, so as to close the barbs when the shoulder $g$ is freed from the ledge $i'$, and for thus freeing it a pull-rope or ropes, G, connecting the several rods D, may be employed.

The position of the several parts of the fork when the tines are to be forced into a cock of hay, is clearly shown in figs. 1 and 3, and the position of the parts when the tines are thrust into a cock of hay, for elevating the same, is clearly shown in figs. 2 and 4, and, in this latter case, it will be seen that the barbs serve to prevent the body of hay from slipping off the tines A and C.

Having thus described my invention,

What I claim as new, and desire to secure by Letters Patent, is—

The arrangement of the tines A, provided with ledges and stay-pins $i$ $i$, the rods D, provided with shoulders $g$ $f$ and springs $h$ $k$, the tine C, the swivel B, and pulley $b$, operating substantially as herein specified.

To the above I have signed my name, this 29th day of January, 1869.

EMANUEL HUONCKER.

Witnesses:
MICHAEL SCHMELTZER,
DANL. L. BATERUFF.